(12) United States Patent
Sorek et al.

(10) Patent No.: US 10,370,967 B2
(45) Date of Patent: Aug. 6, 2019

(54) INTEGRATED JACKING PIPES

(71) Applicant: MEKOROT WATER COMPANY, LTD., Tel-Aviv (IL)

(72) Inventors: Ben Ami Sorek, Rehovot (IL); Orel Markovich, Nof Ayalon (IL)

(73) Assignee: MEKOROT WATER COMPANY, LTD., Tel Aviv (IL)

(*) Notice: Subject to any disclaimer, the term of this patent is extended or adjusted under 35 U.S.C. 154(b) by 0 days.

(21) Appl. No.: 15/509,635

(22) PCT Filed: Sep. 7, 2015

(86) PCT No.: PCT/IL2015/050902
§ 371 (c)(1),
(2) Date: Mar. 10, 2017

(87) PCT Pub. No.: WO2016/038602
PCT Pub. Date: Mar. 17, 2016

(65) Prior Publication Data
US 2017/0298729 A1    Oct. 19, 2017

Related U.S. Application Data

(60) Provisional application No. 62/048,466, filed on Sep. 10, 2014.

(51) Int. Cl.
*E21D 9/00*     (2006.01)
*F16L 1/036*    (2006.01)
*F16L 9/153*    (2006.01)
*F16L 25/00*    (2006.01)
*F16L 13/02*    (2006.01)
*E21B 7/20*     (2006.01)

(52) U.S. Cl.
CPC ............. *E21D 9/005* (2013.01); *E21B 7/20* (2013.01); *F16L 1/036* (2013.01); *F16L 9/153* (2013.01); *F16L 13/02* (2013.01); *F16L 25/0027* (2013.01)

(58) Field of Classification Search
CPC   E21D 9/005; F16L 1/036; F16L 9/153; F16L 13/02; E21B 17/08; E21B 7/30; E21B 7/20
See application file for complete search history.

(56) References Cited

U.S. PATENT DOCUMENTS 4,240,470 A * 12/1980 McPherson ............. F16L 9/123
                                              138/109
4,361,336 A    11/1982 Reeh
4,552,485 A * 11/1985 Hammer ............... E21D 11/385
                                              138/109

(Continued)

FOREIGN PATENT DOCUMENTS

AU   2007221980 A1 * 4/2009 ............. F16L 1/036
AU   2007221980 A1    4/2009
(Continued)

*Primary Examiner* — Carib A Oquendo
(74) *Attorney, Agent, or Firm* — The Roy Gross Law Firm, LLC; Roy Gross

(57) ABSTRACT

An integrated jacking pipe comprising a concrete jacking envelope integrally-formed with and encircling a metal pipe, wherein said metal pipe comprises a spigot protruding from said concrete jacking envelope and a bell whose diameter is larger than a diameter of said spigot.

26 Claims, 4 Drawing Sheets

(56) References Cited

U.S. PATENT DOCUMENTS

| | | | | |
|---|---|---|---|---|
| 4,808,032 | A | * | 2/1989 | John .................. E21B 17/00 138/175 |
| 4,966,494 | A | | 10/1990 | Inagaski et al. |
| 5,097,871 | A | | 3/1992 | Ohta |
| 5,482,404 | A | * | 1/1996 | Tenbusch, II ............ E21B 7/30 138/97 |
| 7,757,718 | B1 | * | 7/2010 | Bruce .................. F16L 49/02 138/96 R |

FOREIGN PATENT DOCUMENTS

| | | | |
|---|---|---|---|
| CN | 202302366 | U | 7/2012 |
| DE | 19817000 | A1 | 10/1998 |
| DE | 29900679 | U1 | 4/1999 |
| JP | 2000145364 | A | 5/2000 |
| JP | 2000257378 | * | 9/2000 |
| JP | 2003214569 | * | 7/2003 |
| WO | 2008136761 | A1 | 11/2008 |
| WO | 2011105342 | A1 | 9/2011 |

* cited by examiner

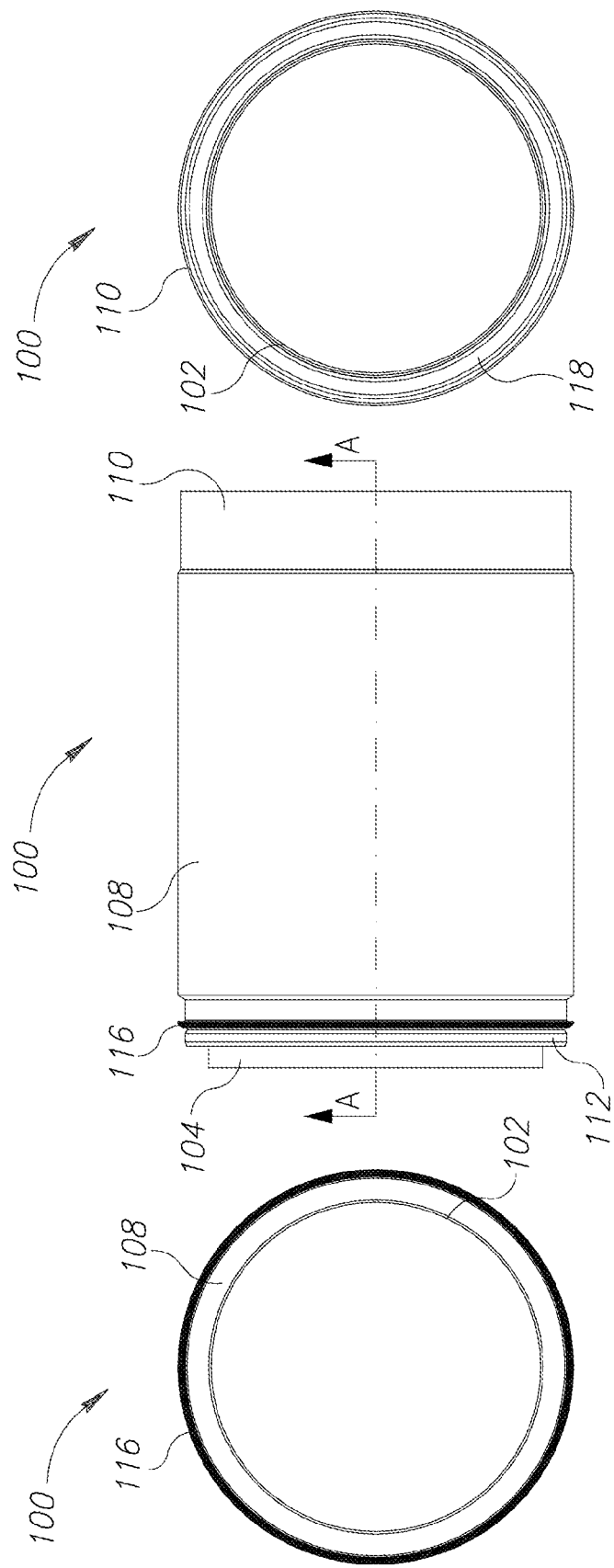

INTEGRATED JACKING PIPES

RELATED APPLICATIONS

This application is a National Phase of PCT Patent Application No. PCT/IL2015/050902 having International filing date of Sep. 7, 2015, which claims the benefit of priority of U.S. Patent Application Nos. 62/048,466 filed on Sep. 10, 2014. The contents of the above applications are all incorporated by reference as if fully set forth herein in their entirety.

FIELD OF THE INVENTION

The invention relates to the field of pipe jacking.

BACKGROUND

Pipe jacking is often referred to as a guided, trenchless method for installation of pipe sections under obstacles. A tunnel is formed using a drilling head, which is pushed further and further into the ground by reinforced concrete jacking pipes pushed behind it, in series. The pushing (or "jacking") is performed using several sets of hydraulic jacks. The drilling head usually houses a mechanical digging arm or a rotating head, and is steered using hydraulic steering jacks. The drilling head may be remotely controlled and navigated by a human operator and/or in an automatic manner. One way of navigating the drilling head is by emitting a laser beam into the jacked pipes, thereby creating a virtual straight path for the drilling head to follow. However, it is quite common to have curved tunnels formed by pipe jacking, in which case the navigation may intentionally but accurately deviate from the straight path of the laser beam.

As the drilling head excavates soil from its frontal area, the soil may be evacuated backwards using one or more conveyors or a pipeline with one or more pumps. Some drilling heads are also equipped for grinding the excavated soil, for easier evacuation. It is also customary to fluidize the soil using one or more suitable agents, to make its evacuation even easier.

Pipe jacked tunnels are commonly manufactured with diameters ranging from 120 cm to 400 cm, however smaller and larger tunnels do exist occasionally. In ground conditions where the tunnel can be exposed to additional pressures due to the plasticity of the ground, intermediate jacking stations are sometimes introduced, to reduce the pressures. The intermediate jacking stations provide for sections of the pipeline (namely, sections formed of multiple jacking pipes) to be independently moved, which reduces the force which the hydraulic jacks, at the entrance to the tunnel, have to apply. In cases of high plasticity ground conditions, reducing of the pressure is also often achieved by lubricating the outer annulus of the pipelines.

A jacking pipe may be made in a way that allows a serial connection of multiple jacking pipes, which finally form the desired tunnel. While the tunnel is being formed, a set of metal pipes is introduced into the serially-connected jacking pipes, to form a conduit in which a fluid will flow. The metal pipes are then welded to one another while introduced process. The welding makes the set of metal pipes form an elongated, sealed conduit within the jacking pipes and along the tunnel.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

An embodiment provides an integrated jacking pipe comprising a concrete jacking envelope integrally-formed with and encircling a metal pipe, wherein said metal pipe comprises a spigot protruding from said concrete jacking envelope and a bell whose diameter is larger than a diameter of said spigot.

A further embodiment provides a method for pipe jacking, comprising: jack-pushing a drilling head into the ground; serially jack-pushing multiple integrated jacking pipes into the ground, wherein each of said multiple integrated jacking pipes comprises a concrete jacking envelope integrally-formed with and encircling a metal pipe, wherein said metal pipe comprises a spigot protruding from said concrete jacking envelope and a bell whose diameter is larger than a diameter of said spigot; and welding said metal pipes of said multiple integrated jacking pipes, to form a sealed conduit.

A further embodiment provides a tunnel comprising a series of integrated jacking pipes each comprising: a concrete jacking envelope integrally-formed with and encircling a metal pipe, wherein said metal pipe comprises a spigot protruding from said concrete jacking envelope and a bell whose diameter is larger than a diameter of said spigot, wherein every adjacent pair of said series of integrated jacking pipes comprises the spigot of one metal pipe welded to the bell of the other metal pipe, and wherein said metal pipes form together a sealed, pressure-resistant, elongated conduit.

In some embodiments, the diameter of said bell is larger than the diameter of said spigot by more than twice a wall thickness of said metal pipe.

In some embodiments, said bell is parallel to said spigot.

In some embodiments, said bell is conical.

In some embodiments, said concrete jacking envelope is made of reinforced concrete.

In some embodiments, said metal pipe is made of steel.

In some embodiments, said concrete jacking envelope comprises a first end portion with a circumferential seal and a second end portion with a circumferential metal collar.

In some embodiments, said concrete jacking envelope comprises a lifting anchor.

In some embodiments, the integrated jacking pipe further comprises a lubrication nozzle formed in both of said concrete jacking envelope and said metal pipe.

In some embodiments, the integrated jacking pipe further comprises a load distributor disposed on a side rim of said concrete jacking envelope.

In some embodiments, said load distributor comprises a plywood pad.

In some embodiments, the method further comprises jack-pushing an intermediate jacking station between two adjacent ones of said multiple integrated jacking pipes, and operating said intermediate jacking station to repeatedly contract and expand.

In some embodiments, said welding is a direct welding between said metal pipes.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 3 shows a front view of the exemplary integrated jacking pipe;

FIG. 4 shows a side view of the exemplary integrated jacking pipe;

FIG. 5 shows a rear view of the exemplary integrated jacking pipe;

DETAILED DESCRIPTION

Figure 1:
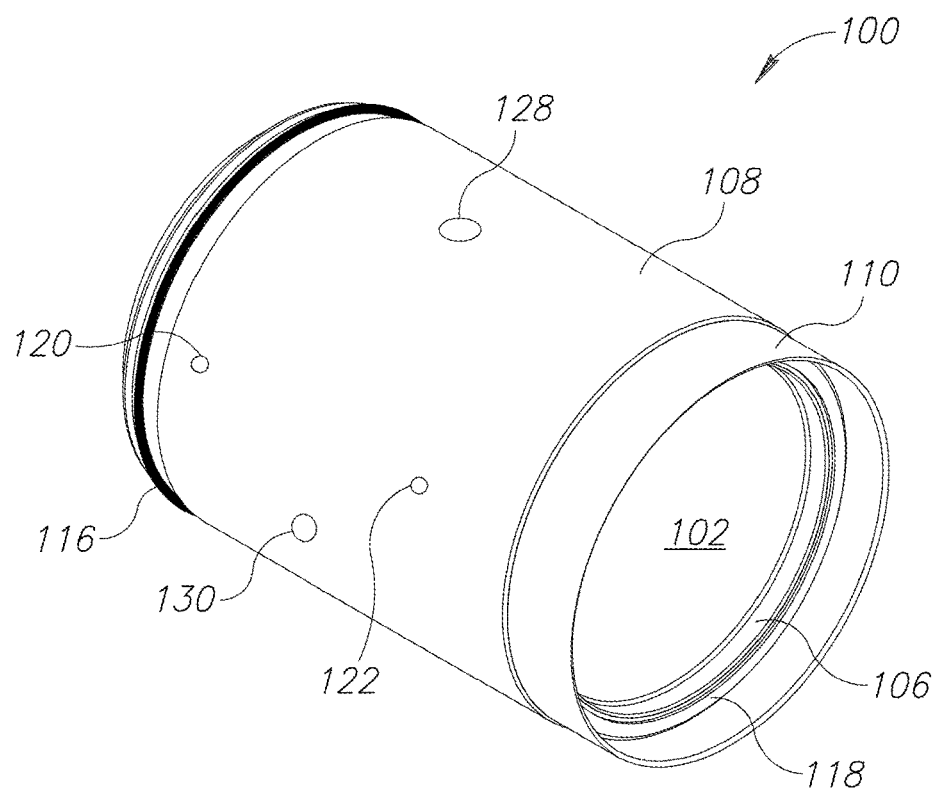
FIG. 1 shows a front isometric view of an exemplary integrated jacking pipe.

Disclosed herein is an integrated jacking pipe which includes a concrete jacking envelope encircling a metal pipe. The concrete jacking envelope and the metal pipe may be integrally-formed, for example by pouring concrete into a space between the metal pipe and a mold encircling the metal pipe, and allowing the concrete to cure.

Advantageously, the integrated jacking pipe may be configured in a way which allows, on one hand, durability of the metal pipe in high internal fluid pressures, and, on the other hand, utilization of the concrete jacking envelope for protecting the metal pipe against forces applied by the soil above, and for withstanding the loads applied during the jacking process.

Further advantageously, multiple integrated jacking pipes may be serially connected in a "bell and spigot" configuration, to form a tunnel; unlike the common method in which a metal ring is used as a welding interface between two adjacent pipes, the present bell and spigot configuration has a much lesser need for labor-intensive welding of the metal pipes.

The metal pipe may have a wider end segment (hereinafter "bell") and a narrower end segment (hereinafter "spigot"), such that, when multiple integrated jacking pipes are connected in series, the spigot of one metal pipe penetrates into the bell of another metal pipe. Following the jacking process, every pair of adjacent bell and spigot may be welded, to form a seal. The metal pipe may be formed such that a certain circumferential clearance is maintained between every pair of adjacent bell and spigot. The clearance may prevent, or at least mitigate, any deformity that can result from contact between one metal pipe and another metal pipe during the pipe jacking process, in which, occasionally, two adjacent metal pipes may change their relative posture. In addition, due to accuracy limitations inherent to the manufacturing process of the integrated jacking pipe, the clearance, while slightly varying between different integrated jacking pipes, may still endow the space needed for the aforesaid purpose. The level of clearance may be selected such that it balances between the deformity prevention and the subsequent welding; while the best welding is naturally achieved with near-zero clearance, adequate welding may still be achieved if some clearance exists, such as a clearance of a few millimeters to a few centimeters.

The concrete jacking envelope, in turn, may include a concrete cylinder which has a narrower end segment (hereinafter "male end segment") on one side, optionally surrounded by a rubber seal, and a circumferential metal collar (hereinafter "female end segment") on the other side. The female end segment may be anchored to the concrete cylinder when the integrated jacking pipe is formed, for example by molding. When multiple integrated jacking pipes are interconnected, the female end segment of one concrete jacking envelope may slide over the male end segment of an adjacent concrete jacking envelope, with the rubber seal interfacing between the two. The rubber seal may prevent unwanted substances, such as underground water or/and a muddy mixture from penetrating the metal pipe.

The concrete jacking envelope may further include a load distributor, such as a plywood pad, disposed on a side rim of the concrete jacking envelope. If two adjacent integrated jacking pipes are not entirely parallel during the jacking process, the load distributor may absorb and distribute, over a relative large area of the side rim, the loads that, otherwise, would not have been evenly distributed over the side rim. This may help prevent damage to the concrete jacking envelope.

A plurality of integrated jacking pipes may be used in a jacking process, for example as follows:

A drilling head, as known in the art, may be jack-pushed, from a jacking pit, into the ground. Following the drilling head, the integrated jacking pipes may be serially jack-pushed into the ground. One or more intermediate jacking stations, as known in the art, may be occasionally jack-pushed between two adjacent integrated jacking pipes, to relieve and distribute some of the pressure applied by the jack-pushing. The one or more intermediate jacking stations may be controlled and operated as known in the art, by causing then to repeatedly contract and expand as necessary.

When enough integrated jacking pipes are jack-pushed and the first integrated jacking pipe in the series emerges from a receiving pit, a welding process may commence. However, if one or more of the intermediate jacking stations were used, these may be evacuated prior to welding. In the welding, the clearance between the spigot of one metal pipe and the bell of an adjacent metal pipe may be welded and filled with a consumable electrode (a "filler"). This welding may be referred to as "direct" "lap welding" of the spigot of one metal pipe to the bell of an adjacent metal pipe, since no other interfacing element, other than the filler, may be used. The filler may be the only interconnection between the two metal pipes.

The end result may be a tunnel composed of a series of integrated jacking pipes, whose metal pipes form a sealed, pressure-resistant, elongated conduit extending between the jacking pit and receiving pit, allowing for the flow of a fluid (i.e. liquid and/or gas), which is optionally pressurized significantly above atmospheric pressure. Common pressures may be from a few bars to ten or more bars.

Reference is now made to FIGS. 1-8, which show, respectively, a front isometric view, a rear isometric view, a lengthwise cross-sectional view, a rear view, a front view, a side view, a rear isometric cross-sectional view and a front isometric cross-sectional view of an exemplary integrated jacking pipe 100. Integrated jacking pipe 100 may include a metal pipe 102 surrounded by a concrete envelope 108.

Metal pipe 102 may have the general shape of a right circular cylinder, except for at least one end segment thereof, as discussed below. In other embodiments (not shown), a metal pipe may have a different general shape, such as an elliptical cylinder, a hollow N-gonal prism (where N≥3), a non-symmetrical amorphous shape, etc.

A wall thickness of metal pipe 102 may be determined based on, for example, an intended fluid pressure anticipated to flow within the metal pipe, a viscosity of the fluid, an intended flow rate of the fluid, and/or the like. For example, the wall thickness may be between 0.4-1 centimeters (cm), 1-2 cm, 2-3 cm, 3-5 cm, or more than 5 cm.

Similarly, a diameter of metal pipe 102 may be determined based on, for example, an intended fluid pressure anticipated to flow within the metal pipe, a viscosity of the fluid, an intended flow rate of the fluid, and/or the like. For example, the diameter may be between 50-100 cm, 100-200 cm, 200-300 cm, 300-400 cm, or more than 400 cm.

Metal pipe 102 may be made, for example, of Grade B steel, as defined in ASTM International, "A139/A139M-04 (2010): Standard Specification for Electric-Fusion (Arc)-Welded Steel Pipe (NPS 4 and Over). Metal pipe 102 may include a main segment 102a which bears the shape of a right circular cylinder, as discussed above. Metal pipe 102 may also include a spigot 104 which protrudes out of concrete envelope 108. Further, metal pipe 102 may include a bell 106. Segments 102a, 104 and 106 may be integrally-formed as a single metal pipe.

Spigot 104 may be a direct continuation of main segment 102a, namely, it may have the same diameter as main segment 102a. Bell 106 may have a diameter larger than that of main segment 102a. The difference between the diameters of bell 106 and main segment 102a may be over twice the wall thickness of metal pipe 102; for example, if the wall thickness is X, the diameter of bell 106 may be larger than the diameter of main segment 102a by 2X+a, where a is larger than zero. Namely, a indicates the amount of clearance between a spigot of one metal pipe as it fits inside a bell of another metal pipe. In some embodiments, a measures between 2-15 millimeters. In other embodiments, a measures between 5-12 millimeters. In other embodiments, a measures between 8-10 millimeters.

The transition between the main segment 102a and bell 106 may be a bend in metal pipe 102, which bend is optionally sigmoid-curved.

Bell 106 may extend in a parallel manner with respect to main segment 102a, namely—bell 106 may have a uniform diameter along its length. In other embodiments (not shown), a bell may be cone-shaped, opening gradually in the opposite direction from a main segment.

In some embodiments, metal pipe 102 may be coated with a polyethylene layer (not shown) along a substantial amount of its outer surface, up to the entirety of its outer surface. Optionally, the polyethylene layer is approximately 5 millimeters (+50%, −20%) thick. In further options, the polyethylene layer may have a different thickness. The polyethylene layer may serve to absorb expansion of metal pipe 102, and prevent its expansion from reaching and affecting concrete envelope 108. Namely, the polyethylene layer may allow a certain degree of motion freedom between metal pipe 102 and concrete envelope 108. Additionally or alternatively, the polyethylene layer may serve to prevent or mitigate corrosion to metal pipe 102, in case humidity reaches the area of the metal pipe. One example is when concrete envelope 108 ruptures and allows water to penetrate it towards metal pipe 102. In these embodiments, concrete envelope 108 contacts the polyethylene layer and not metal pipe 102 directly.

In some embodiments, an edge 134 of bell 106, and optionally some of the internal surface of the bell which remains non-welded, may undergo coating with an anticorrosive coating along the entire circumference of that edge. The coating may take place after a bell of one integrated jacking pipe has been welded to the spigot of another jacking pipe. To this end, spigot 104 is optionally provided with one or multiple apertures (not shown) along its circumference, through which a coating agent may be injected, in liquid form, from inside metal pipe 102 to a space delimited between: edge 134, a non-welded internal surface of bell 106, a plywood pad 118 (further discussed below), and an edge 136 of concrete envelope 108. The injected coating agent may propagate along the circumference of bell 106 and optionally its non-welded internal surface, and completely fill the aforementioned space. After curing or hardening (depending on the type of coating agent used), the coating may protect edge 134 and optionally some of the non-welded internal surface of bell 106, from the damaging effect of humidity and water. Optionally, the coating agent includes one or more epoxy resins which cure after being injected through the apertures in spigot 104.

Concrete envelope 108 may have the shape of a right circular cylinder, except for two opposing end portions of concrete envelope 108, as discussed below. In other embodiments (not shown), concrete envelope 108 may have a different shape, such as an elliptical cylinder, a hollow N-gonal prism (where N≥3), a non-symmetrical amorphous shape, etc.

Concrete envelope 108 may be made of reinforced concrete. The reinforcement may be using steel bars and/or the like which are implanted in concrete envelope 108 when it is formed.

Concrete envelope 108, due to being formed by pouring concrete over metal pipe 102, may have an inner shape imitating an outer shape of metal pipe 102. A wall thickness of concrete envelope 108 may be dictated by the outer shape of metal pipe 102 and the shape of the mold used (not shown). The wall thickness of concrete envelope 108 may be determined based on, for example, predicted loads that may be applied to the concrete envelope during the jacking process, a pressure of the upper soil on the concrete envelope 108, requirements under certain standards and/or the like.

Concrete envelope 108 may include a first end portion 112, a second end portion 114 and a female end segment 110 positioned about the second end portion. Female end segment 110 may be secured to concrete envelope 108 with one or more rigid anchors, such as anchor 110a, which are transplanted inside the concrete envelope when formed.

Female end segment 110 may enable a precise serial connection between two adjacent ones of integrated jacking pipe 100. Namely, female end segment 110 may receive and guide a first end portion of an adjacent concrete envelope 108, as the two are moved towards one another in the jacking process.

Additionally or alternatively, female end segment 110 may enable the forming of a seal between two adjacent ones of concrete envelope 108. To this end, first end portion 112 may have a circumferential (optionally rubber) seal 116 disposed over it, such as inside a niche in the first end portion. Circumferential seal 116 may be used in order to seal the connection between two adjacent ones of integrated jacking pipe 100. Namely, a female end segment of one concrete envelope may encircle and engage a circumferential seal of another concrete envelope, thereby forming a seal between the two. Such seal may be useful, for example, in cases where the jacking process takes place in a moist soil and/or in underground water.

Concrete envelope 108 may further include a load distributor, such as a ring-shaped plywood pad 118, disposed on a side rim nearest second end portion 114 of the concrete envelope. Plywood pad 118 may be use to absorb and distribute the loads around the rim surface of concrete envelope 108, when two concrete envelopes are pushed one against the other in the jacking process. Plywood pad 118 may compensate for the fact that an interface between the side rim nearest second end portion 114 of one concrete envelope, and a side ream nearest first end portion 112 of another concrete envelope, may not be flat. Namely, these rims may not be in full contact with one another, causing excessive forces to be applied to one or more sub-areas of the rims. Plywood pad 118 may distribute these forces more evenly across the areas of the rims.

Concrete envelope 108 may further include one or more lifting anchors, such as lifting anchors 120, 122, 124, 126. Lifting anchors 120, 122, 124 and 126 may enable securing integrated jacking pipe 100 to a crane or the like, for transporting the integrated jacking pipe, inserting it into a jacking pit, etc. One or more of lifting anchors 120, 122, 124 and 126 are optionally DEHA-type anchors embedded inside concrete envelope 108; these anchors may be implanted when the concrete envelope is formed. Lifting anchor 120 is shown enlarged, making its shape more clearly visible—an elongated cylinder with two opposing wider end segments, one embedded in concrete envelope 108 and one exposed.

One or more lubrication nozzles, such as nozzles 128, 130, 132, may exist in both concrete envelope 108 and metal pipe 102. Each such nozzle may be an opening which extends from an inner void of metal pipe 102 and out of an outer surface of concrete envelope 108. Nozzles 128, 130, 132 may be used for injection of a lubrication fluid in cases of rough soil conditions, as known in the art, thereby reducing friction between an outer surface of concrete envelope 108 and the soil. Optionally, when the injection of the lubrication fluid ends, one or more of nozzles 128, 130, 132 may be sealed, for example with a combination of a sealant (not shown) deposited within the nozzles, and a conical steel cap (not shown) threaded from within metal pipe 102 into each of the nozzles. Once fully threaded, each conical steel cap may lie essentially flat with the rest of the internal surface of metal pipe 102. Optionally, the circumference of the conical steel cap may then be welded to metal pipe 102, to form a durable seal able to withstand the anticipated fluid pressure in the metal pipe.

Figure 2:
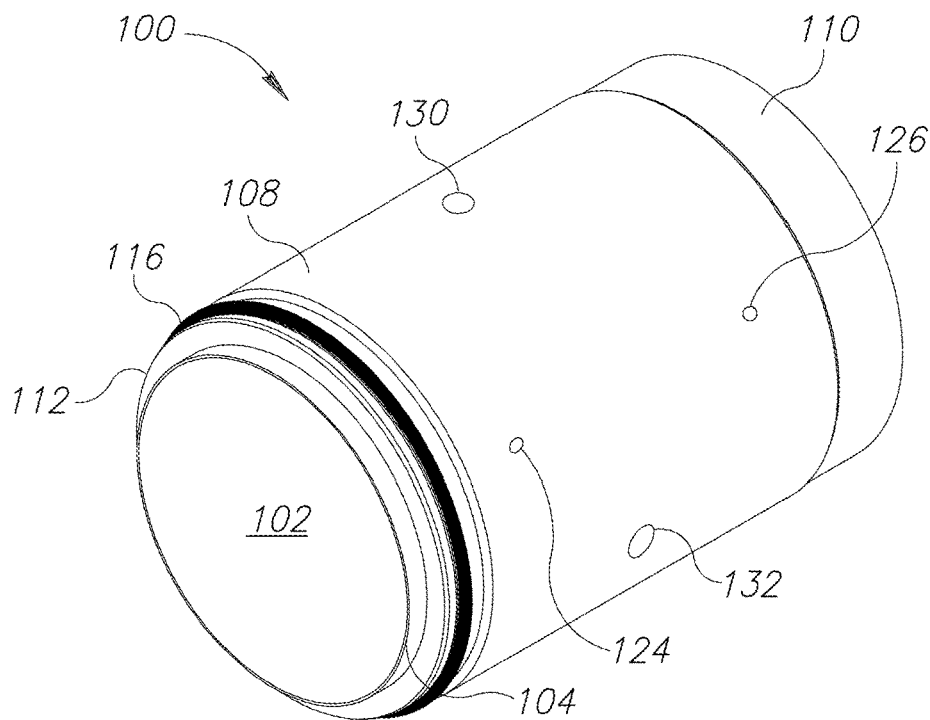
FIG. 2 shows a rear isometric view of the exemplary integrated jacking pipe.
Figure 6:
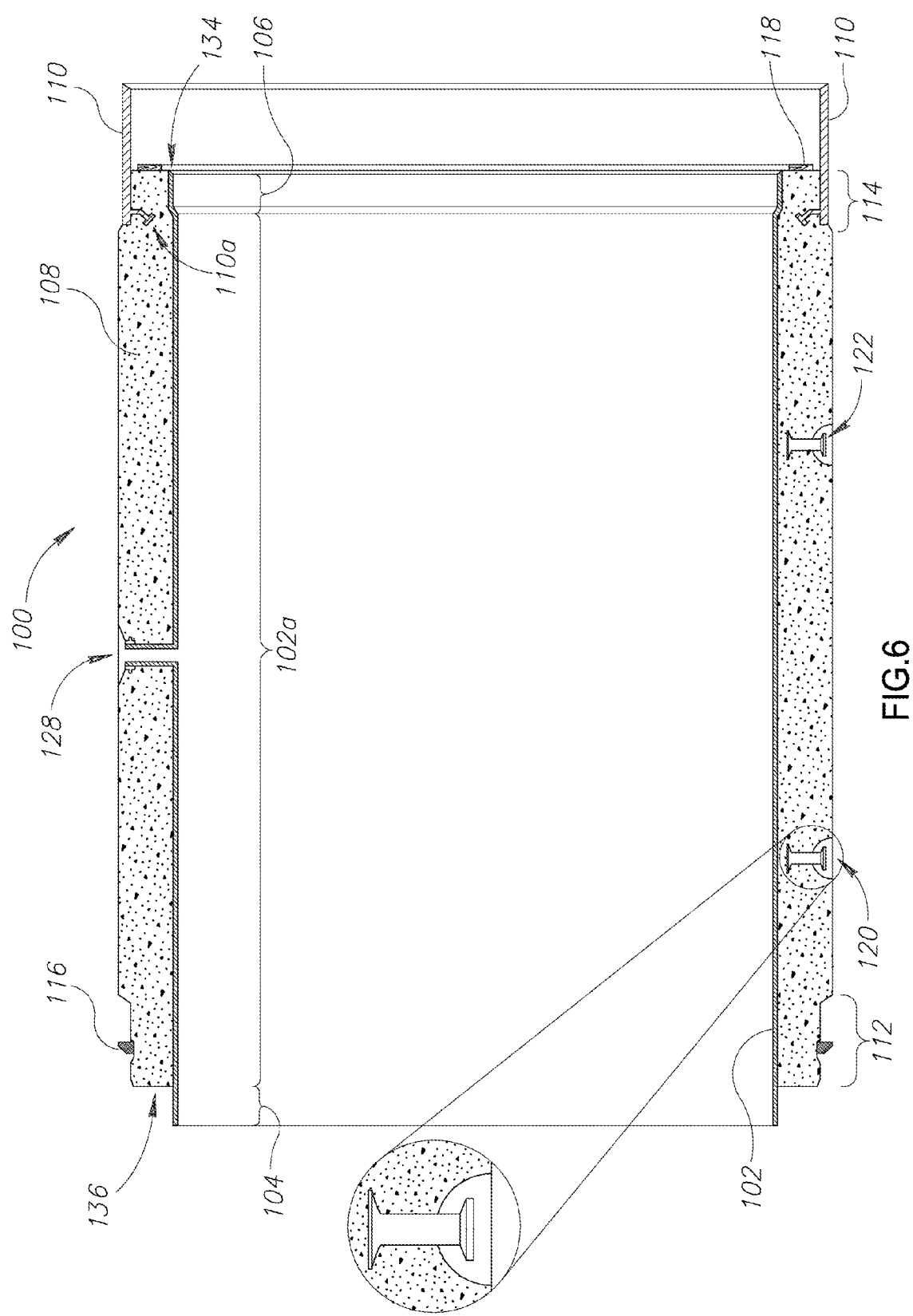
FIG. 6 shows a side cross-sectional view of the exemplary integrated jacking pipe.
Figure 7:
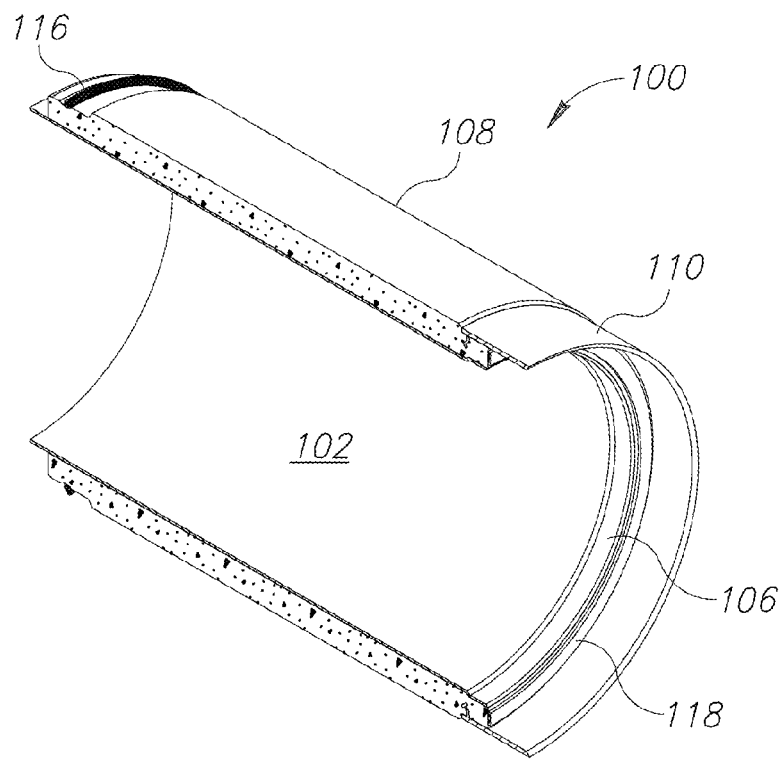
FIG. 7 shows front isometric cross-sectional view of the exemplary integrated jacking pipe.
Figure 8:
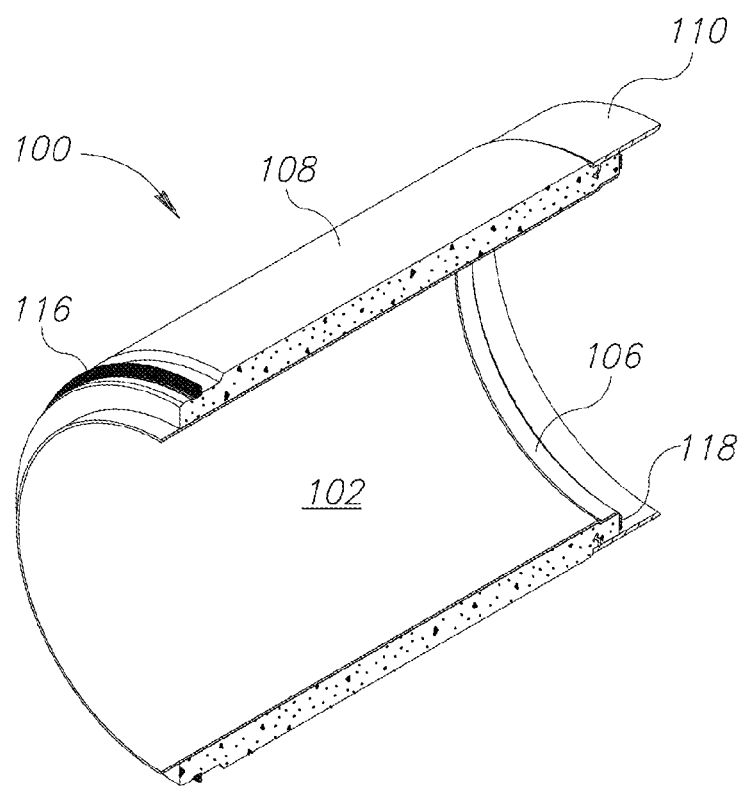
FIG. 8 shows rear isometric cross-sectional view of the exemplary integrated jacking pipe.

With regard to nozzles 128, 130, 132 and lifting anchors 120, 122, 124, 126, it should be noted that a radial position of some of these elements has been shifted between FIGS. 1-2 versus FIG. 6, in order for some of these elements to be more conveniently-visible in the cross sectional view which FIG. 6 provides. In addition, the position of these elements in integrated jacking pipe 100, as shown in the various figures, is only one example of such positioning. In other embodiments (not shown), the position of one or more such elements may be different, and determined, for example, by considerations related to lifting and lubrication, respectively.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. An integrated jacking pipe comprising a concrete jacking envelope integrally-formed with and encircling a metal pipe,
   wherein said metal pipe comprises a spigot protruding from said concrete jacking envelope and a bell whose diameter is larger than a diameter of said spigot,
   wherein said spigot and a bell of an adjacent integrated jacking pipe define a circumferential clearance between said spigot and said bell of said adjacent integrated jacking pipe, to prevent contact between said metal pipe and a metal pipe of said adjacent integrated jacking pipe during a pipe jacking process, and
   wherein said concrete jacking envelope is configured to withstand loads applied during said pipe jacking process.

2. The integrated jacking pipe according to claim 1, wherein the diameter of said bell is larger than the diameter of said spigot by more than twice a wall thickness of said metal pipe.

3. The integrated jacking pipe according to claim 1, wherein said concrete jacking envelope is made of reinforced concrete.

4. The integrated jacking pipe according to claim 1, wherein said metal pipe is made of steel.

5. The integrated jacking pipe according to claim 1, wherein said concrete jacking envelope comprises a first end portion with a circumferential seal and a second end portion with a circumferential metal collar.

6. The integrated jacking pipe according to claim 1, further comprising a lubrication nozzle formed in both of said concrete jacking envelope and said metal pipe.

7. The integrated jacking pipe according to claim 1, further comprising a load distributor disposed on a side rim of said concrete jacking envelope.

8. The integrated jacking pipe according to claim 7, wherein said load distributor comprises a plywood pad.

9. A method for pipe jacking, comprising:
   jack-pushing a drilling head into the ground;
   serially jack-pushing multiple integrated jacking pipes into the ground, wherein each of said multiple integrated jacking pipes comprises a concrete jacking envelope integrally-formed with and encircling a metal pipe, wherein said metal pipe comprises a spigot protruding from said concrete jacking envelope and a bell whose diameter is larger than a diameter of said spigot; and
   welding, in every adjacent pair of said metal pipes of said multiple integrated jacking pipes, the spigot of one metal pipe to the bell of the other metal pipe, to form a sealed conduit,
   wherein said spigot of said one metal pipe and said bell of said other metal pipe define a circumferential clearance therebetween to prevent contact between said one metal pipe and said other metal pipe during said jack-pushing,
   wherein said concrete jacking envelope is configured to withstand loads applied during said jack-pushing.

10. The method according to claim 9, further comprising jack-pushing an intermediate jacking station between two adjacent ones of said multiple integrated jacking pipes, and operating said intermediate jacking station to repeatedly contract and expand.

11. The method according to claim 9, wherein said welding is a direct welding between said metal pipes.

12. The method according to claim 9, wherein the diameter of said bell is larger than the diameter of said spigot by more than twice a wall thickness of said metal pipe.

13. The method according to claim 9, wherein said concrete jacking envelope is made of reinforced concrete.

14. The method according to claim 9, wherein said metal pipe is made of steel.

15. The method according to claim 9, wherein said concrete jacking envelope comprises a first end portion with a circumferential seal and a second end portion with a circumferential metal collar.

16. The method according to claim 9, wherein at least some of said multiple integrated jacking pipes further comprises a lubrication nozzle formed in both of said concrete jacking envelope and said metal pipe.

17. The method according to claim 9, wherein at least some of said multiple integrated jacking pipes further comprises a load distributor disposed on a side rim of said concrete jacking envelope.

18. The method according to claim 17, wherein said load distributor comprises a plywood pad.

19. A tunnel comprising a series of integrated jacking pipes each comprising:
a concrete jacking envelope integrally-formed with and encircling a metal pipe,
wherein said metal pipe comprises a spigot protruding from said concrete jacking envelope and a bell whose diameter is larger than a diameter of said spigot,
wherein every adjacent pair of said series of integrated jacking pipes comprises the spigot of one metal pipe welded to the bell of the other metal pipe,
wherein said spigot of said one metal pipe and said bell of said other metal pipe define a circumferential clearance therebetween to prevent contact between said one metal pipe and said other metal pipe during a pipe jacking process,
wherein said concrete jacking envelope is configured to withstand loads applied during said pipe jacking process, and
wherein said metal pipes form together a sealed, pressure-resistant, elongated conduit.

20. The tunnel according to claim 19, wherein the diameter of said bell is larger than the diameter of said spigot by more than twice a wall thickness of said metal pipe.

21. The tunnel according to claim 19, wherein said concrete jacking envelope is made of reinforced concrete.

22. The tunnel according to claim 19, wherein said metal pipe is made of steel.

23. The tunnel according to claim 19, wherein said concrete jacking envelope comprises a first end portion with a circumferential seal and a second end portion with a circumferential metal collar.

24. The tunnel according to claim 19, wherein at least some integrated jacking pipes of said series of integrated jacking pipes further comprises a lubrication nozzle formed in both of said concrete jacking envelope and said metal pipe.

25. The tunnel according to claim 19, wherein at least some integrated jacking pipes of said series of integrated jacking pipes further comprises a load distributor disposed on a side rim of said concrete jacking envelope.

26. The tunnel according to claim 25, wherein said load distributor comprises a plywood pad.

* * * * *